(12) United States Patent
Sharp et al.

(10) Patent No.: US 12,555,695 B2
(45) Date of Patent: Feb. 17, 2026

(54) NUCLEAR POWER GENERATION SYSTEM

(71) Applicant: Rolls-Royce SMR Limited, Derby (GB)

(72) Inventors: Euan Sharp, Derby (GB); Gerard Halliday, Derby (GB); Daniel Robertson, Derby (GB); Stephen Calvert, Derby (GB); Matthew Morris, Derby (GB)

(73) Assignee: Rolls-Royce SMR Limited, Derbyshire (GB)

( * ) Notice: Subject to any disclaimer, the term of this patent is extended or adjusted under 35 U.S.C. 154(b) by 277 days.

(21) Appl. No.: 18/039,128

(22) PCT Filed: Nov. 12, 2021

(86) PCT No.: PCT/EP2021/081551
§ 371 (c)(1),
(2) Date: May 26, 2023

(87) PCT Pub. No.: WO2022/117319
PCT Pub. Date: Jun. 9, 2022

(65) Prior Publication Data
US 2023/0420148 A1 Dec. 28, 2023

(30) Foreign Application Priority Data
Dec. 3, 2020 (GB) .................................... 2019073

(51) Int. Cl.
*G21C 19/32* (2006.01)
*G21C 19/20* (2006.01)

(52) U.S. Cl.
CPC ............. *G21C 19/32* (2013.01); *G21C 19/20* (2013.01)

(58) Field of Classification Search
CPC .... G21C 19/20; G21C 19/205; G21C 19/207; G21C 19/32
See application file for complete search history.

(56) References Cited

U.S. PATENT DOCUMENTS

| 2,841,545 A | | 7/1958 | Zinn |
| 3,293,136 A | * | 12/1966 | Harris .................... G21C 19/18 376/393 |
| 3,344,032 A | | 9/1967 | Vendryes et al. |

(Continued)

FOREIGN PATENT DOCUMENTS

| EP | 2811487 A1 | 9/2015 |
| FR | 1462267 A | 4/1966 |

(Continued)

OTHER PUBLICATIONS

UKIPO Search Report, Application No. GB-1907637.1, dated Dec. 2, 2021, 2 pages. (Reply date Jun. 1, 2021).

(Continued)

*Primary Examiner* — Sharon M Davis
(74) *Attorney, Agent, or Firm* — Quarles & Brady, LLP (57) ABSTRACT

Disclosed is a nuclear power generation system comprising a reactor vessel comprising a body defining a cavity housing a reactor core, and an integrated head package having a closure head for closing an opening to the cavity. The system also comprises a containment structure having a working floor surrounding and substantially vertically aligned with the opening to the cavity.

17 Claims, 2 Drawing Sheets

(56) References Cited

U.S. PATENT DOCUMENTS

| | | | | |
|---|---|---|---|---|
| 3,733,250 A | * | 5/1973 | Van Santen et al. | G21C 19/10 976/DIG. 251 |
| 3,744,593 A | * | 7/1973 | Jones | G21C 19/02 187/244 |
| 4,056,435 A | * | 11/1977 | Carlier | G21C 19/20 976/DIG. 258 |
| 5,896,430 A | * | 4/1999 | Baversten | G21C 19/20 376/269 |
| 2003/0156676 A1 | | 8/2003 | Colditz et al. | |
| 2010/0067644 A1 | | 3/2010 | D'Auvergne | |
| 2019/0392958 A1 | | 12/2019 | Inman et al. | |

FOREIGN PATENT DOCUMENTS

| | | |
|---|---|---|
| FR | 2404897 A | 4/1979 |
| JP | S62-185198 A | 8/1987 |
| JP | H08262181 A | 10/1996 |
| WO | WO-2010/030259 A1 | 3/2010 |

OTHER PUBLICATIONS

International Search Report and Written Opinion, International Application No. PCT/EP2021/081551, European Patent Office-Searching Authority, mailed Jul. 4, 2022, 20 pages.

AP-1000 Westinghouse USA, "Status of Advanced Light Water Reactor Designs 2004", IAEA, May 2004, 30 pages.

Office Action, corresponding to JP 2023-534022, dated Aug. 19, 2025.

* cited by examiner

NUCLEAR POWER GENERATION SYSTEM

RELATED APPLICATIONS

This application is a 35 U.S.C. § 371 national phase application of PCT/EP2021/081551 (WO-2022/117319 A1), filed on Nov. 12, 2021, entitled "NUCLEAR POWER GENERATION SYSTEM", and claims priority to GB-2019073.2 filed on Dec. 3, 2020, which is incorporated herein by reference in its entirety.

FIELD OF THE DISCLOSURE

The present disclosure relates to a nuclear power generation system; and to a method of performing maintenance and refuelling operations in a nuclear power generation system.

BACKGROUND

Nuclear power plants convert heat energy from the nuclear decay of fissile material in fuel assemblies contained in a reactor core into electrical energy. Water cooled reactor nuclear power plants, for example, pressurised water reactor (PWR) and boiling water reactor (BWR) plants, include a reactor pressure vessel (RPV), which contains the reactor core/fuel assemblies, and a turbine for generating electricity from steam (produced by heat from the fuel assemblies).

PWR plants have a pressurised primary coolant circuit which flows through the RPV and transfers heat energy to one or more steam generators (heat exchangers) within a secondary circuit. The (lower pressure) secondary circuit comprises a steam turbine which drives a generator for the production of electricity. These components of a nuclear plant are conventionally housed in an airtight containment building, which may be in the form of a concrete structure.

The RPV typically comprises a body defining a cavity for containing the nuclear reactor (i.e. including the fuel assemblies) and a closure head for closing an upper opening to the cavity. The closure head may form part of an integrated head package (IHP) (or integrated head assembly) which further comprises a control rod drive mechanism contained within a shroud. The control rod drive mechanism comprises drive rods which pass through the closure head and are connected to control rods contained within the reactor core. The control rods are provided to absorb neutron radiation within the core and thus control the nuclear reactions within the reactor core. The drive rods within the control rod drive mechanism are powered by a power supply to vertically translate to thus raise and lower the control rods within the reactor core. The reactor core further comprises guide columns for the control rods and these, along with the associated electronics are typically called the "upper internals".

Maintenance and refuelling are important parts of the operation of a nuclear power generation system. Maintenance is required periodically e.g. to replace old and/or damaged parts of the system. Refuelling is required periodically (e.g. every 18-24 months) in order to replace spent fuel rods within the fuel assemblies.

When performing maintenance/refuelling of the reactor core, it is necessary to remove the IHP from the RPV, thereby revealing the reactor core. The IHP is typically removably attached to the body by a plurality of closure studs (formed of nuts and bolts). Each of the IHP and body comprises an outwardly projecting circumferential flange having a plurality of holes that are circumferentially spaced so as to extend around the RPV. When the IHP is mounted to the body, the holes are aligned, bolts are received through the holes, and nuts are engaged with the bolts to secure them in the holes. Once the reactor core is exposed, the upper internals are removed from the reactor core to access the fuel rods in the fuel assemblies.

In order to perform maintenance and refuelling operations in a nuclear power generation system, an overhead crane arrangement such as a polar gantry crane having a circular runway is typically provided within the containment structure of the system. Polar cranes are necessarily large, heavy structures in order to allow the lifting of the heavy components of the nuclear power generation system. This makes polar cranes expensive to install, and their accommodation in the containment structure significantly increases the cost of construction of the containment structure.

During refuelling, the polar crane typically lifts the IHP from the RPV body vertically upwards, moves the IHP horizontally away from the RPV body and then lowers it onto a storage stand on the working floor within the containment building. The polar crane is then used to lift the upper internals which typically weigh around 15 to 50 tonnes and are radioactive. The polar crane raises the internals vertically and then horizontally before lowering them into a storage pool of water in which they are submerged. This is to provide gamma shielding around the internals during refuelling.

The reactor vessel body is typically located a significant distance below the working floor of the containment structure in order to provide a refuelling cavity above the exposed reactor core within the reactor vessel body. During removal of the IHP from the reactor vessel body, the drive rods remain connected to the control rods and protrude from the reactor vessel cavity into the refuelling cavity that is flooded with water to contain any radioactive emissions from the drive rods.

The water in the refuelling cavity also acts to shield and cool the spent fuel rods within the exposed reactor core. A height of 4 metres of water is required above the fuel rods/fuel assemblies for effective gamma shielding. Filling the refuelling cavity thus requires very large volumes of water and is thus time consuming.

The protruding drive rods or the vertical extent of the refuelling cavity drives the necessary lift height of the upper internals by the polar crane as the upper internals have to clear the vertical height of the drive rods/refuelling cavity before being moved horizontally and lowered into the storage pool.

The necessary lift height of the polar crane dictates the height of containment structure (and thus the cost/time associated with the building of the containment structure). The risks associated with dropping the upper internals from any significant vertical height onto the reactor core are very high.

To remove spent fuel rods, they are typically hoisted vertically from the reactor vessel body and then translated horizontally within the flooded refuelling cavity using a remotely operated overhead travelling crane. They are then rotated from a vertical position to a horizontal position (using a turnover rig) and subsequently transported out of the containment structure on a rod transport device via a flooded tunnel.

The overhead travelling crane is necessarily large and heavy and requires large concrete structures to support it within the containment structure. This makes such cranes expensive to install.

The process of removing the fuel rods requires transfer of the spent fuel rods between the crane, the turnover rig and the rod transport device making the process time-consuming and susceptible to malfunction. If the fuel rod removal process fails, the spent fuel rods may become trapped and inaccessible in the flooded tunnel.

There is a need for an improved nuclear power generation system which mitigates at least some of the problems associated with the known systems.

SUMMARY

According to a first aspect there is provided a nuclear power generation system comprising: a reactor vessel comprising a body defining a cavity housing a reactor core, and a closure head for closing an opening to the cavity; and a containment structure having a working floor surrounding and substantially vertically aligned with the opening to the cavity.

By providing a containment working floor that is substantially vertically aligned with the opening to the cavity in the reactor vessel body, the closure head may be removed from the body by a device (e.g. a lifting device) that can be moved to and from the reactor vessel along the working floor and that need only raise the closure head by a small vertical height (e.g. less than 0.5 m) before moving it horizontally. Thus, the lifting device may lift from the working floor to push the closure head upwards. Such a device can replace a crane (e.g. a gantry crane or polar crane) mounted above the reactor vessel. This may allow a reduction in the overall height of an enclosure (e.g. containment building) that houses the reactor vessel. In this way, the containment building may be faster (and more cost effective) to construct.

Given the scale of nuclear power generation systems, the term "substantially vertically aligned" means that the vertical spacing between the working floor and the opening to the cavity (defined by an upper end of the reactor vessel body) is less than 2 metres, e.g. 1 metre or 0.5 metres. The reactor opens by the vertical removal of the closure head. Thus, the opening to the reactor body may be the circumference of the lip of the reactor body which may aligned in the horizontal plane. The term vertically aligned in this context means that the working floor is positioned sufficiently close to the opening to permit a lifting device to raise the closure head by lifting from beneath i.e. pushing the closure head up from the working floor.

Optional features of the present disclosure will now be set out. These are applicable singly or in any combination with any aspect of the present disclosure.

The closure head may be comprised as part of the integrated head package. In use, closure head or integrated head package is located vertically above and adjacent to the body.

In some embodiments, the system (or e.g. the working floor) comprises a pathway extending from a deployment location adjacent the reactor vessel to a storage location (e.g. remote from the reactor vessel). The deployment location may be substantially vertically aligned with the opening to the cavity. The deployment location may be horizontally or vertically (i.e. above) adjacent to the reactor vessel. The pathway may be substantially vertically aligned with the opening to the cavity in the reactor vessel body. The provision of a pathway aligned with the opening to the cavity in the reactor body may avoid the need to lift components of the reactor vessel to any significant height, which could otherwise lead to safety issues (e.g. a risk of those components being inadvertently dropped).

In some embodiments, the pathway may be a linear pathway extending between the reactor vessel and the storage location. In some embodiments, the pathway may be a substantially horizontal pathway. The working floor (e.g. or an upper surface thereof) may be substantially planar and horizontal.

The storage location may be a first storage location and the pathway may additionally extend from the deployment location to a second storage location such that the deployment location is between the first and second storage locations. In other words, the pathway may extend from the first storage location to the reactor vessel (i.e. the deployment location), and beyond the reactor vessel to the second storage location. In some embodiments the pathway may be a first pathway and the system may further comprise a second pathway that may extend from the deployment location to a third storage location. The second pathway may be substantially perpendicular to the first pathway (i.e. when viewed from above).

In some embodiments, the or each pathway may comprise one or more tracks or rails extending from adjacent the reactor vessel to the storage location. The tracks or rails may be substantially vertically aligned with the opening to the cavity in the reactor vessel body. The one or more tracks or rails may be formed into or supported on the working floor. In some cases, the one or more tracks or rails may be supported a short distance above the working floor (e.g. less than 1 metre). The use of tracks/rails may facilitate automation of movement of maintenance/refuelling devices along the at least one pathway which, in turn may reduce the number of workers required to perform maintenance/refuelling (which may reduce the safety risks associated with these processes).

The tracks or rails may be in the form of a pair of tracks or rails extending from the deployment location to the or each storage location. At the deployment location, the pair of tracks or rails may be spaced either side of the reactor vessel. That is, a portion of the reactor vessel may extend between the pair of tracks or rails. Thus, the distance between the pair of tracks or rails may be larger than an external diameter of the reactor vessel or a cavity in which the reactor vessel is located. The pair of tracks or rails may be parallel, or the gauge of the pair of tracks or rails may vary along their length.

In other embodiments, for example where the gauge of the tracks/rail is less than the reactor vessel or cavity, the tracks/rails may comprise a removable/temporary portion that extends over (i.e. so as to be vertically above) the reactor vessel body to allow the positioning of various lifting/tensioning/refuelling devices directly over the reactor vessel body/reactor core.

Each of the closure head and body of the reactor vessel may comprise an attachment portion for attachment of the closure head to the body. Each attachment portion may comprise an outwardly projecting circumferential flange. The diameter of one of the flanges may define the external diameter of the reactor vessel. Each flange may comprise apertures therethrough for receipt of e.g. closure studs to attach the flanges (and thus the closure head and the body) together. The apertures may be spaced circumferentially about the reactor vessel. The closure head may comprise a pressure seal at lower end thereof for sealing the closure head with the upper end of the body.

The reactor core may contain a control rod assembly and upper internals for guiding the control rod assembly. The closure head may be comprised as part of an integrated head package (IHP). The closure head of the IHP may be housed within a shroud, and the IHP may further comprise a control rod drive mechanism that is also housed within the shroud. The control rod drive mechanism may comprise at least one drive rod (and preferably a plurality of drive rods) extending through the closure head. The or each drive rod may comprise a coupling element (e.g. a pneumatic coupling element) for releasably coupling to a control rod assembly within the reactor core. The at least one drive rod may be movable to a maintenance/refuelling position in which the at least one drive rod is uncoupled from the control rod assembly and at least partially (preferably fully) retracted into the IHP (e.g. into the shroud). The IHP may further comprise at least one locking element for locking the at least one drive rod in the maintenance/refuelling position. This IHP allows the drive rods to be removed from the reactor core along with the IHP. In this way, the need for a flooded refuelling cavity is removed as there will be no radioactive drive rods left protruding from the reactor core when the IHP is removed. Alternatively, the control rod drive mechanisms/ locking elements may be separate to the closure head.

The or each pathway may be substantially vertically aligned with a lower end of the IHP (when secured to the body). The or each pathway may be substantially vertically aligned with the attachment portions of the reactor vessel. At the deployment location, the lateral (horizontal) spacing between the at least one pathway (e.g. between the one or more tracks or rails) and the reactor vessel may be less than 50% of an external diameter of the reactor vessel. The distance may be e.g. less than 25% of an external diameter of the reactor vessel.

The containment structure may comprise a base structure (e.g. formed of concrete) defining a reactor vessel cavity into which the reactor vessel is received. The working floor may be supported above the base structure (e.g. by the base structure). The working floor may comprise an opening to the reactor vessel cavity. A portion of the reactor vessel may project through (and above) this opening.

The system may comprise a plurality of steam generators circumferentially spaced about the reactor vessel. The plurality of steam generators may be radially spaced from the reactor vessel. The or each pathway may extend between first and second steam generators of the plurality of steam generators. The plurality of steam generators may be fluidly connected to the reactor vessel by a plurality of pipes and the base structure may comprise openings and/or passages accommodating the pipes. Each steam generator, or the pipes connected to the steam generator, may project through a corresponding opening formed in the working floor (i.e. from below the working floor to above the working floor). The steam generators may be supported laterally from the working floor. For example, each steam generator may comprise one or more support elements extending between the steam generator and the working floor for providing lateral support to the steam generator. Each steam generator may be located (substantially) above the working floor (i.e. a substantial portion of, or all of, the steam generator may be above the working floor).

The system may comprise one or more fans or water-cooling systems for cooling the reactor vessel (e.g. the closure head/body of the reactor vessel). The fans/cooling systems may be supported on the working floor and may be adjacent the reactor vessel (e.g. adjacent the IHP of the reactor vessel). The fans may alternatively be mounted to a ceiling above the reactor vessel. The lowering in height of the ceiling (i.e. due to dispensing of the crane) may allow ceiling mounting due to closer proximity to the reactor vessel closure head.

The containment structure may comprise one or more walls defining an internal space in which the reactor vessel is contained. The remote storage location (i.e. the first storage location) may be in an annex structure that may be separate from (i.e. external to) the containment structure. The annex structure may be shielded. The annex structure may be separated from the containment structure by at least one separating wall. The at least one separating wall may comprise an opening connecting internal spaces of the containment structure and the annex structure. The at least one separating wall may comprise a hatch (i.e. a door) movable between an open position (in which access is provided through the opening) and a sealed position (in which the annex structure is sealed from the containment structure).

The first pathway may extend from the containment structure to the annex structure through the opening in the separating wall. Where the first pathway comprises pair of tracks or rails, the gauge (i.e. distance between) the pair of tracks or rails may be larger at the deployment location than at the opening. This may help minimise the size of the opening.

The annex structure may house a plurality of maintenance devices configured for movement along the or each pathway (e.g. tracks or rails). Thus, each of the devices may comprise wheels for movement along the or each pathway (e.g. configured for engagement with the tracks or rails). The devices may be configured to perform maintenance operations on the reactor vessel. For example, the plurality of devices may comprise a stud tensioner/detensioner device for tensioning/detensioning studs attaching the closure head to the body of the reactor vessel. The plurality of devices may further comprise a closure head lifting device for lifting the closure head away from the reactor body. The plurality of devices may further comprise a reactor vessel internals cask for storing internal components of the reactor vessel. The plurality of devices may also comprise a refuelling device for replacing (and storing) spent fuel.

Each device may comprise driving means (e.g. an electric motor) for driving the wheels, and a power source (e.g. a battery) for supplying power to the driving means. Each device may comprise a controller for controlling the driving means. Each controller may comprise a memory for storing instructions for moving the device in a predefined manner. Alternatively or additionally, they may be controlled remotely via wired or wireless connection to e.g. a user interface or controller for automatic control.

One or more of the devices may be collapsible. That is, one or more of the devices may be configured to be moveable between a collapsed configuration and an expanded configuration. This may be facilitated, for example, by a structure of the device comprising telescoping, pivoting or hinged components. The device may include actuators for moving the device between its collapsed and expanded configurations. In the collapsed configuration the height and/or width of the device may be less than in the expanded configuration. The device may be movable (e.g. drivable) in the collapsed configuration. In this way, when the device is required to be moved through an opening e.g. into and out of the containment structure, the size of the opening (i.e. to accommodate the device) may be minimised. Thus, the device may be transported in the collapsed configuration and may perform a maintenance operation in the expanded configuration.

When the system comprises a plurality of devices, the first pathway may comprise a plurality of branches at the storage location providing access to the first pathway. For example, each branch may be in the form of tracks or rails that extend across, and that are perpendicular to, the first pathway (e.g. the tracks or rails of the first pathway). In a stored position, the plurality of devices may each be located at respective branches of the first pathway. Where the branches comprise separate tracks or rails to the tracks or rails of the first pathway, each device may be configured to switch between movement along the branches and the first pathway. For example, each device may comprise first and second sets of wheels for independent engagement with the tracks or rails of the branches and first pathway. The first or second sets of wheels may comprise a variable height suspension to lift the other set of wheels clear of the tracks or rails (or to drop the other set of wheels onto the tracks or rails).

Alternatively, the system may comprise one or more turntables at the intersection of the first pathway and the branches. The turntables may be rotatable to transfer a device from the (e.g. tracks or rails of the) branches to the (e.g. tracks or rails of the) first pathway.

In another embodiment, instead of the first pathway comprising branches, the annex structure may comprise a crane (e.g. a gantry crane). The crane may be operative to move the devices from a stored position (e.g. on a floor of the annex structure) to the first pathway (e.g. tracks or rails of the first pathway).

The system may comprise a further structure which may be in the form of a fuel storage structure, which may be separate from the annex (when present) and containment structures. The fuel storage structure may define a further storage location (e.g. fourth storage location). The fuel storage structure may be located adjacent the annex structure, such that the annex structure is between the fuel storage and containment structures. The fuel storage structure may be separated from the annex structure and/or containment structure by one or more separating walls, which may comprise an opening connecting internal spaces of the annex and fuel storage structure. The separating wall in which the opening is formed may comprise a hatch movable between an open position and a sealed position. The first pathway may extend from the containment structure to the fuel storage structure (which may be via the annex structure).

The refuelling device may be stored in the fuel storage structure. The fuel storage structure may comprise a fuel pool for storing spent fuel. The system may comprise cooling/safety systems (e.g. pumps, generator, etc.) for maintaining a water level of the fuel pool. These cooling/safety systems may be located in the fuel storage structure. The refuelling device may be operatively connected to the cooling/safety systems. Thus, the refuelling device may be connected to electrical and/or water lines of the cooling and/or safety systems. The electrical and/or water lines may be provided on a reel or a concertina mechanism to allow the refuelling device to move from the fuel storage structure to the containment structure whilst maintaining connection with the cooling/safety systems.

The system may comprise a plurality of nuclear reactors housed in corresponding further containment structures. Each nuclear reactor may be served by the devices of the annex and/or fuel storage structures (e.g. by further pathways). In this respect, a single device may serve multiple reactors. This may reduce the number of devices required on nuclear plant sites having multiple reactors.

The system may comprise a pressurised water reactor (PWR) system. That is, the reactor vessel (and steam generators) may form part of a PWR system.

In a second aspect, there is provided a method for maintaining a nuclear power generation system according to the first aspect, the method comprising:

supporting a maintenance device on the working floor of the containment structure;

moving the maintenance device to the deployment location; and operating the maintenance device to perform a maintenance operation on the reactor vessel of the nuclear power generation system.

The maintenance device may be a closure head/IHP lifting device (such as that described above with respect to the first aspect) and the maintenance operation may comprise lifting the closure head of the reactor vessel above the body of the reactor vessel. In this respect, the closure head lifting device may be moved from a remote storage location (e.g. the first storage location) to the deployment location (prior to performing the lifting operation) along the first pathway. The movement of the closure head lifting device may be e.g. along tracks or rails supported on (e.g. formed into) the working floor. The closure head may be comprised as part of an IHP, thus the closure head lifting device may lift an IHP.

The method may further comprise moving the lifting device, whilst supporting the lifted closure head, along the first pathway to a storage location, e.g. the second storage location. When the lifting device is moved a lower end of the closure head/IHP may be maintained at a vertical height of less than e.g. less than 0.5 m.

The method may comprise, prior to lifting the closure head, detensioning closure studs attaching the closure head to the body. The detensioning of the closure studs may comprise moving a tensioner/detensioner device on the pathway (e.g. the first pathway) from a storage location (e.g. the first storage location) to the deployment location, which may be immediately above the body. In this way, the detensioning may be performed by the tensioner/detensioner device. The tensioner/detensioner device may be mounted to the closure head, and lifted and moved with the closure head, or the tensioner/detensioner device may then be moved to the first or second storage locations, along the first pathway after the detensioning has been performed.

The method may further comprise moving an internals cask from a storage location (e.g. the first storage location) to the deployment location, which may be immediately above the body of the reactor vessel (i.e. after movement of the closure head away from the body). Subsequently, the internals cask may be operated to withdraw reactor internals from the body of the reactor vessel. The internals may comprise a winch for withdrawing the internals from the body. The internals cask may form a seal with the body of the reactor vessel or a cavity containing the reactor vessel prior to withdrawing the reactor internals. Once the reactor internals are withdrawn, the method may comprise moving the internals cask along e.g. the first pathway to a storage location, such as the first storage location.

The method may further comprise moving a refuelling device from a storage location (e.g. a fourth storage location in the fuel storage structure) to a location above (e.g. immediately above) the body of the reactor vessel along the first pathway. The refuelling device may be operated to withdraw and store one or more spent fuel assemblies from the body of the reactor vessel. The refuelling device may be operated to insert one or more replacement fuel assemblies into the reactor body. The method may comprise, subsequently moving the device along the first pathway to a storage location (e.g. refuelling enclosure). Once at the storage location, the refuelling device may be operated to deposit the spent fuel assemblies withdrawn from the reactor vessel. The withdrawn (i.e. spent) fuel assemblies may be deposited in a fuel pool at the storage location.

The method may be reversed to reassemble the reactor vessel. Thus, the internals cask may be moved to a deployment position above the body and be operated to re-insert reactor internals into the body. The reactor internals may then be returned to the storage location along the one or more tracks or rails. The closure head lifting device may then be moved to the deployment location (positioning the closure head above the body) and may lower the closure head onto the body. The closure head lifting device may then be returned to a storage location (such as the first or second storage location) along the first pathway (e.g. tracks or rails of the first pathway). The stud tensioner/detensioner device may then be moved to the deployment location along the first pathway (which may not be required if the stud tensioner/detensioner device is already mounted to the closure head). The method may then comprise operating the stud tensioner/detensioner device to engage the closure studs with the closure head and body of the reactor vessel and tension the closure studs to secure the closure head to the body.

Movement of the device(s) may be performed by driving wheels of the devices. The wheels of the devices may be driven along tracks or rails of the first and/or second pathways. The wheels may be driven remotely, or according to predefined instructions. The tracks or rails may be as described above with respect to the first aspect. Thus, for example, the tracks or rails may be in pairs and may be substantially horizontal. The tracks or rails may be vertically aligned with the opening of the cavity in the body of the reactor vessel.

The method may comprise opening and closing the hatches separating the containment, annex and fuel storage structures. Thus, the hatches may be opened to allow a device to pass from one structure to another and then subsequently closed to seal between structures.

The present invention may comprise, be comprised as part of a nuclear reactor power plant or be used with a nuclear power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

The nuclear core may be comprised of a number of fuel assemblies, with the fuel assemblies containing fuel rods. The fuel rods may be formed of pellets of fissile material. The fuel assemblies may also include space for control rods. For example, the fuel assembly may provide a housing for a 17×17 grid of rods i.e. 289 total spaces. Of these 289 total spaces, 24 may be reserved for the control rods for the reactor, each of which may be formed of 24 control rodlets connected to a main arm, and one may be reserved for an instrumentation tube. The control rods are movable in and out of the core to provide control of the fission process undergone by the fuel, by absorbing neutrons released during nuclear fission. The reactor core may comprise between 100-300 fuel assemblies. Fully inserting the control rods may typically lead to a subcritical state in which the reactor is shutdown. Up to 100% of fuel assemblies in the reactor core may contain control rods.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

SUMMARY OF THE FIGURES

Embodiments will now be described by way of example only, with reference to the Figures, in which.

DETAILED DESCRIPTION

Aspects and embodiments of the present disclosure will now be discussed with reference to the accompanying FIGS. Further aspects and embodiments will be apparent to those skilled in the art.

Figure 1A:
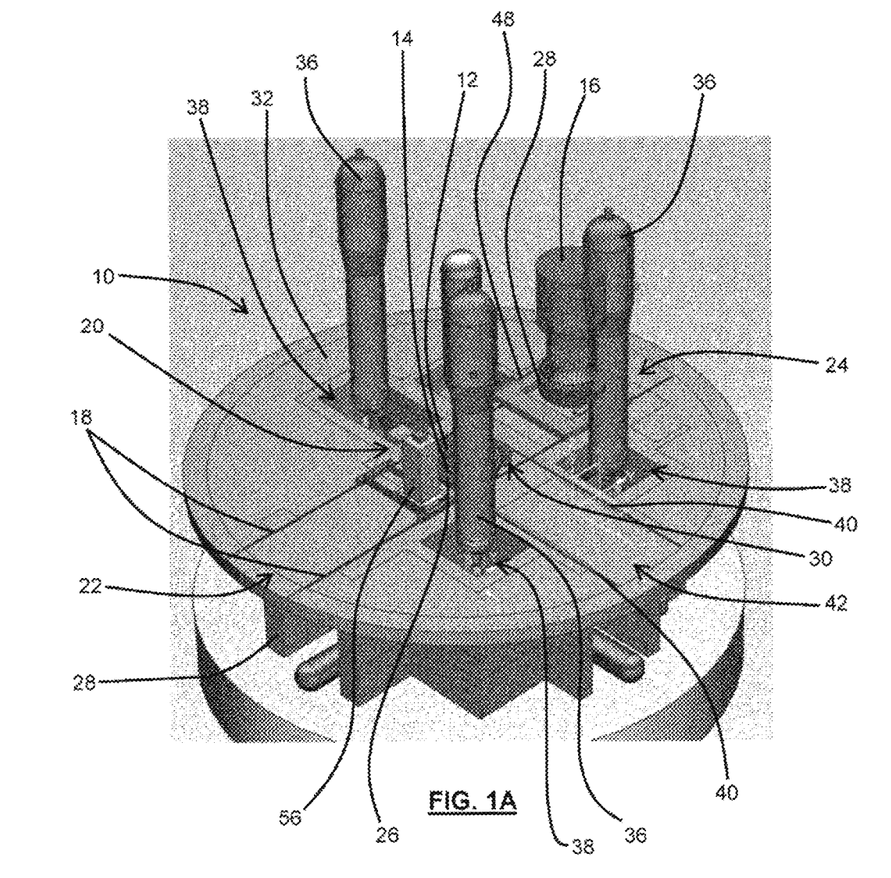
FIG. 1A is a perspective view of a containment structure of a nuclear power generation system.

FIG. 1A shows the interior of a containment structure 10 of a nuclear power generation system. Whist not apparent from the FIGS., the containment structure 10 is a containment building of a nuclear power generation system. So that the various components enclosed within the containment structure 10 can be seen, the walls of the containment structure 10 are not illustrated.

The system comprises a reactor vessel 12 comprising a body 14 defining a cavity for accommodating a nuclear reactor and an IHP 16 for closing an opening to the cavity. In FIG. 1A, the IHP 16 is shown in a position in which it has been removed, and moved away from, the body 14. The system further comprises a first pathway in the form of a first pair of spaced parallel tracks 18 that extend from a deployment location 20 laterally adjacent to the reactor vessel 12 to a first storage location 22 (shown in FIG. 1B). The deployment location 20 (and thus the reactor vessel 12) is centrally located within the containment structure 10, whilst the storage location 22 is located externally to the containment structure 10. In some embodiments, one or more of the storage locations may be external to the containment structure.

The first pair of tracks 18 extend along a substantially horizontal and linear pathway between the deployment 20 and storage 22 locations. At the deployment location 20, the first pair of tracks 18 are spaced either side of the reactor vessel 12 (i.e. such that the reactor vessel 12 is located between the first pair of tracks 18 at the deployment location 20). The first pair of tracks 18 also extend beyond the reactor vessel 12, along the linear path, to a second storage location 24 (i.e. the deployment location 20 being between the first 22 and second 24 storage locations). In FIG. 1A, the IHP 16 of the reactor vessel 12 is positioned at this second storage location 24. The IHP comprises a closure head which cooperates with the reactor body Each of the body 14 and IHP 16 of the reactor vessel 12 comprises an attachment portion in the form of an outwardly extending circumferential flange 26. These flanges 26 comprise circumferentially spaced apertures for receipt of closure studs to secure the IHP 16 to the body 14.

The containment structure 10 comprises a base structure 28 formed of reinforced concrete, which defines a reactor vessel cavity 30 into which the reactor vessel 12 is received. Whilst not shown in FIG. 1A, it should be appreciated that, when the IHP 16 is secured to the body 14, the IHP 16 projects from an upper opening of the cavity 30. The base structure 28 supports a substantially planar and circular working floor 32 (which extends across the top of the base structure 28). The opening to the reactor vessel cavity 30 is formed in the working floor 32. The working floor 32 is vertically aligned (i.e. at the same height) as the opening to the cavity of the body 12, so as to be generally aligned with the flanges 26 of the reactor vessel 12.

The first pair of tracks 18, which are formed of steel, are set into the working floor 32. Thus, the tracks 18, like the working floor 32, are vertically aligned with the opening of the body 12 of the reactor vessel 12.

The containment structure 10 further contains three steam generators 36 that are circumferentially spaced about (and radially from) the reactor vessel 12. The steam generators 36 are in fluid connection with the reactor vessel 12 by way of a plurality of pipes. These pipes extend through openings and passages formed in the base structure 28. The working floor 32 comprises three steam generator openings 38 that the steam generators 36 project through so as to be disposed substantially above the working floor. The first pair of tracks 18 extend between these steam generator openings 38 and thus between the steam generators 36.

A second pair of tracks 40 also extends between the steam generator openings 36 (and the steam generators 38). This second pair of tracks 40 is also formed into the working floor 32 and extend from a peripheral region (i.e. a third storage location 42) of the working floor 32 to the reactor vessel 12. In particular, the second pair of tracks 40 extend generally perpendicularly (when viewed from above) to the first pair of tracks 18. Like the first pair of tracks 18, the second pair of tracks 40 are parallel and spaced either side of the reactor vessel 12 (i.e. at the deployment location 20). However, unlike the first pair of tracks 18, the second pair of tracks 40 do not extend beyond the reactor vessel 12.

Figure 1B:
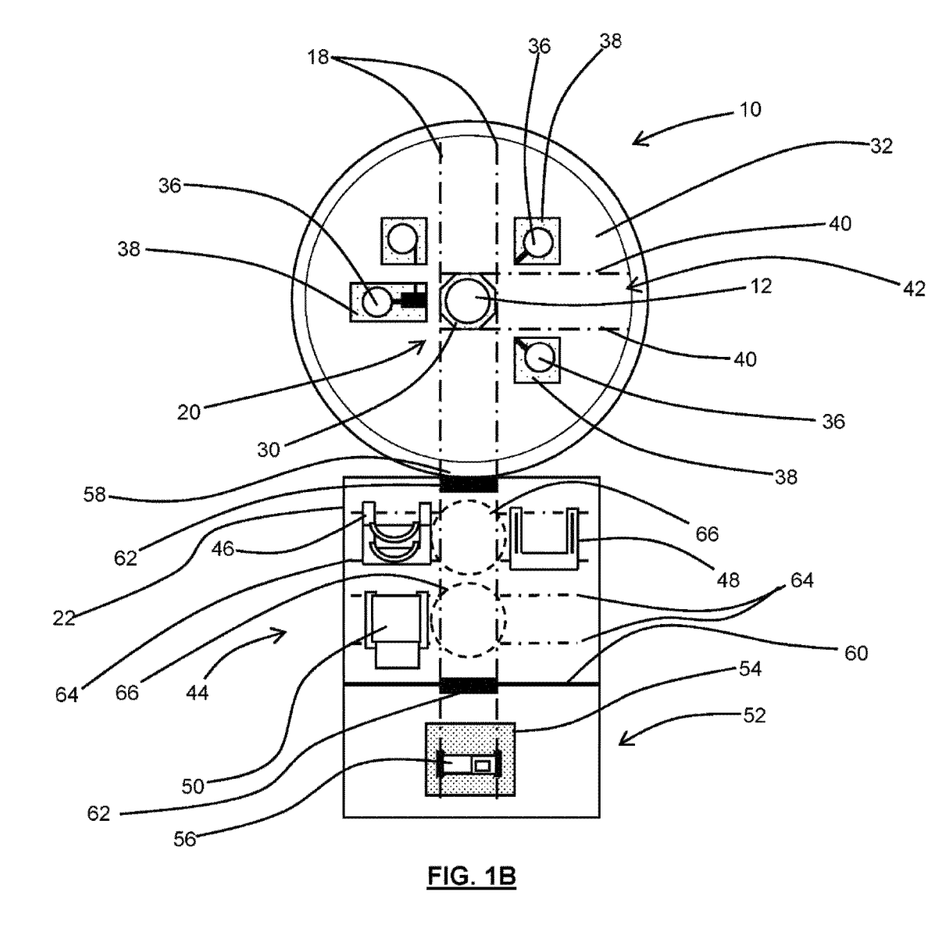
FIG. 1B is a schematic view of the power generation system shown in FIG. 1A.

As is apparent from FIG. 1B, the system comprises an annex structure 44 that is adjacent to the containment structure 10. The annex structure 44 houses a plurality of maintenance devices that are used to maintain the reactor vessel 12 (and other components of the system). In particular, three devices are housed in the annex structure 44. These devices are a stud tensioner/detensioner device 46, an IHP lifting device 48, and a reactor vessel internals cask 50. The stud tensioner/detensioner device 46 is configured to tension/detension studs securing the IHP 16 of the reactor vessel 12 to the body 14 (e.g. to allow removal or securing of the IHP 16). The IHP lifting device 46 is configured to lift the IHP 16 above the body 14 and can move the IHP 16 laterally away from the body 14. The internals cask 50 is configured to remove reactor internals from the body 14 of the reactor vessel 12 and to store the internals.

A fuel storage structure 52 (which may define a fourth storage location) is located adjacent to the annex structure 44, such that the annex structure 44 is disposed between the fuel storage 52 and containment 10 structures. The fuel storage structure 52 comprises a fuel storage pool 54 and a refuelling device 56 that is configured to remove and replace spent fuel from the reactor vessel 12 and deliver the spent fuel to the fuel storage pool 54.

The annex structure 44 is separated from the containment structure 10 by a first separating wall 58, and from the fuel storage structure 52 by a second separating wall 60. Each of the first 58 and second 60 separating walls comprise openings that are sealed by corresponding hatches 62. As will be discussed further below, these hatches 62 are openable to allow access between the structures 10, 44, 52.

The first pair of tracks 18 extend from the containment structure 10, through the hatches 62 and to the fuel storage structure 52 (i.e. via the annex structure 44). The annex structure 44 comprises branches (branching from the first pair of tracks 18) in the form of pairs of cross tracks 64 that extend transversely across the second enclosure 44 so as to be perpendicular to the first pair of tracks 18 (and parallel to the second pair of tracks 40). Each of the stud tensioner/detensioner device 46, IHP lifting device 48 and internals cask 50 is supported on a pair of these cross tracks 64. The cross tracks 64 are operatively connected to the first pair of tracks 18 by turntables 66. The turntables 66 can be rotated to align with the first pair of tracks 18 or the cross tracks 64, such that a device can be moved onto the turntable 66 from a first pair of tracks and then rotated so as to be able to move another pair of tracks. As should be appreciated from FIG. 1B, this allows the devices 46, 48, 50 housed in the annex structure 44 to move from the annex structure 44 to the reactor vessel 12 in the containment structure 10 (through the hatch 62). As will be described below, this allows the devices 46, 48, 50 to be used to maintain (e.g. refuel) the reactor vessel 12.

As an example, the devices 46, 48, 50 in the annex structure 44, and the refuelling device 56 may be used to refuel the reactor vessel 12. An exemplary method for performing this will now be described. First, the reactor vessel 12 is de-pressurised and cooled down before the refuelling process can begin. The hatch 62 connecting the annex structure 44 with the containment structure 10 is opened and the stud tensioner/detensioner device 46 is moved from the annex structure 44 to the containment structure 10 so as to be adjacent the reactor vessel 12. The stud tensioner/detensioner device 46 disconnects the closure studs which attach the IHP 16 the body 14. Once disconnected, the stud tensioner/detensioner device 46 is returned to its storage position in the annex structure 44. The lifting device 48 is then moved so as to be adjacent the reactor vessel 12. The lifting device 48 lifts the IHP 16 above the body 14 and moves the IHP 16 further along the first pair of tracks 18 towards the second storage location 24.

Subsequently, the internals cask 50 is moved so as to be positioned immediately above the body 14 (i.e. where the closure head 16 was previously located). The internals cask 50 seals around the reactor cavity opening 30 and extracts the reactor upper internals from the cavity of the body 14. These internals are removed to allow fuel assemblies to be removed from the body 14. The internals cask 50 is configured to shield radiation from the extracted internals. Once the internals are extracted, the internals cast 50 is returned the annex structure 44.

The hatch 62 connecting the annex 44 and fuel storage 52 structures is then opened, and the refuelling device 56 is moved from the fuel storage structure 52 to the reactor vessel 12. In particular, the refuelling device 56 is positioned immediately above the reactor vessel 12. The refuelling device 56 comprises a dual-axis (i.e. X-Y axis) movement mechanism to allow it to access specific fuel assemblies in the nuclear core. This may allow the refuelling device 56 to reposition one or more fuel assemblies within the nuclear core. The refuelling device 56 also comprises a shielded lifting device which extracts fuel assemblies vertically from the body 14.

Once the fuel assemblies are extracted, the refuelling device 56 delivers the extracted fuel assemblies from the reactor vessel 12 to the fuel storage structure 52 and deposits the fuel in the pool 54. The refuelling device 56 may subsequently deliver fuel (e.g. new fuel) from the pool 54 to the reactor vessel by retrieving the fuel from the pool 54 and returning to the reactor vessel 12.

Once the fuel is removed and/or any repositioning and replacement of fuel is performed, the internals are replaced by the internals cask 50, the IHP 16 is be moved back onto the body 14 (by the closure head lifting device 48), and the closure studs are engaged with the reactor vessel 12 and tensioned by the stud tensioner/detensioner device 46. The hatches 62 are then be closed in order to seal the enclosures 10, 44, 52.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nuclear power generation system comprising:
a reactor vessel comprising a body defining a cavity housing a reactor core, and a closure head for closing an opening to the cavity; and
a containment structure having a working floor surrounding and substantially vertically aligned with the opening to the cavity; and
a pathway comprising one or more tracks or rails formed into of supported on the working floor,
wherein the one or more tracks or rails are a pair of parallel tracks or rails and wherein a portion of the reactor vessel extends between the pair of tracks or rails.

2. The nuclear power generation system according to claim 1 comprising a base structure supporting the working floor, the base structure defining a cavity having an upper opening formed in the working floor for receipt of the reactor vessel.

3. The nuclear power generation system according to claim 1 wherein the reactor vessel forms part of a pressurised water reactor system.

4. The nuclear power generation system according to claim 1, wherein the pathway extends from a deployment location adjacent the reactor vessel to a first storage location remote from the reactor vessel, the deployment location being substantially vertically aligned with the opening to the cavity.

5. The nuclear power generation system according to claim 4 wherein the pathway extends from the deployment location to a second storage location, and wherein the deployment location is between the first and second storage locations.

6. The nuclear power generation system according to claim 5 comprising an annex structure separated from the containment structure by at least one separating wall, the annex structure comprising the first storage location.

7. The nuclear power generation system according to claim 6 comprising a hatch in the at least one separating wall, the hatch moveable between a closed position in which the containment and annex structures are sealed from one another, and an open position in which access is provided between the containment and annex structures, and wherein the pathway extends through the batch.

8. The nuclear power generation system according to claim 6 comprising one or more maintenance devices, each comprising wheels for movement along the pathway between the containment and annex structures.

9. The nuclear power generation system according to claim 8 wherein the one or more maintenance devices comprises one or more of: a stud tensioner/detensioner device, a closure head lifting device, a reactor internals cask, and a reactor refuelling device.

10. The nuclear power generation system according to claim 9 wherein at least one of the one or more maintenance devices is movable between a collapsed configuration and an expanded configuration.

11. The nuclear power generation system according to claim 9 comprising a fuel storage structure separated from the annex structure by at least one separating wall, the pathway extending between the annex structure and the fuel storage structures, and wherein the fuel storage structure comprises a fuel pool for storage of spent fuel.

12. The nuclear power generation system according to claim 4 comprising a plurality of steam generators circumferentially spaced about the reactor vessel, the pathway passing between first and second steam generators of the plurality of steam generators.

13. A method for maintaining a nuclear power generation system according claim 4, the method comprising:

supporting a maintenance device on the working floor of the containment structure;

moving the maintenance device to the deployment location; and operating the maintenance device to perform a maintenance operation on the reactor vessel of the nuclear power generation system.

14. The method according to claim 13 wherein the maintenance device is a closure head lifting device and the maintenance operation comprises lifting the closure head of the reactor vessel above the body of the reactor vessel.

15. The method according to claim 14 comprising moving the head closure head lifting device, whilst supporting the closure head, along the pathway to the first storage location.

16. The method according to claim 15 comprising moving an internals cask along the pathway from the first storage location to the deployment location, operating the internals cask to withdraw reactor internals from the body, then subsequently moving the internals cask along the pathway to the first storage location.

17. The method according to claim 16 comprising moving a refuelling device along the pathway from the first storage location to the deployment location and withdrawing and replacing fuel assemblies in the body of the reactor vessel using the refuelling device.

* * * * *